(12) United States Patent
Champion et al.

(10) Patent No.: US 7,262,607 B2
(45) Date of Patent: Aug. 28, 2007

(54) CHARACTERIZING SUBSTANCES WITH MULTISTATIC PROBES

(75) Inventors: James Robert Champion, Maryville, TN (US); William Peters Schenk, Jr., Rockford, TN (US); Kenneth Alan Cupples, Knoxville, TN (US)

(73) Assignee: Robertshaw Controls Company, Richmond, VA (US)

(*) Notice: Subject to any disclaimer, the term of this patent is extended or adjusted under 35 U.S.C. 154(b) by 0 days.

(21) Appl. No.: 10/657,938

(22) Filed: Sep. 9, 2003

(65) Prior Publication Data

US 2004/0046571 A1 Mar. 11, 2004

Related U.S. Application Data

(60) Provisional application No. 60/409,360, filed on Sep. 9, 2002.

(51) Int. Cl.
*G01R 27/32* (2006.01)
(52) U.S. Cl. .................................. 324/639; 324/637
(58) Field of Classification Search ............ 324/76.24, 324/637, 679, 642, 644, 539
See application file for complete search history.

(56) References Cited

U.S. PATENT DOCUMENTS

| | | | |
|---|---|---|---|
| 3,208,281 A | | 9/1965 | Kalmus et al. |
| 3,277,711 A | | 10/1966 | Roberge .................. 73/304 C |
| 4,733,560 A | * | 3/1988 | Dam ....................... 73/304 C |
| 5,609,059 A | | 3/1997 | McEwan ..................... 73/290 |
| 5,841,028 A | | 11/1998 | Bray et al. |
| 5,898,308 A | * | 4/1999 | Champion ................. 324/643 |
| 5,910,188 A | * | 6/1999 | Resnick .................... 73/290 R |
| 6,023,970 A | * | 2/2000 | Blaine ..................... 73/304 R |
| 6,137,282 A | * | 10/2000 | Macke et al. .............. 324/71.1 |
| 6,216,540 B1 | | 4/2001 | Nelson et al. ............... 73/633 |
| 6,229,476 B1 | | 5/2001 | Lütke et al. ................ 342/124 |
| 6,237,412 B1 | | 5/2001 | Morimoto ................. 73/304 C |

(Continued)

FOREIGN PATENT DOCUMENTS

FR 2 763 682 A 11/1998

OTHER PUBLICATIONS

"Section 3: Ground Penetrating Radar" 4-GPR, http://sfu.ca/earth-sciences/courses/307/4-gpr.htm, printed Mar. 24, 2003, pp. 1-47.

(Continued)

*Primary Examiner*—Walter Benson
(74) *Attorney, Agent, or Firm*—Foley Hoag LLP

(57) ABSTRACT

The disclosed technology can be used in the development and operation of multistatic probes that can characterize substances and relationships between substances. A multistatic probe can include transmitting and receiving conductive elements that are electrically distinct and which are capable of conveying electromagnetic energy to/from a substance of interest. The transmitting and receiving conductive elements can be arranged to be in contact with at least one dielectric mismatch boundary between substances of interest, whereby an electromagnetic signal transmitted on the transmitting conductive element causes a corresponding electromagnetic signal to be coupled to the receiving conductive element in response to the transmitted signal being in proximity to the dielectric mismatch boundary. Attributes of the received electromagnetic signal can be evaluated relative to the transmitted electromagnetic signal to determine one or more characteristics associated with at least one of the substances forming the dielectric mismatch boundary.

26 Claims, 7 Drawing Sheets

U.S. PATENT DOCUMENTS

| | | | |
|---|---|---|---|
| 6,250,601 B1 | 6/2001 | Kolar et al. | 251/129.04 |
| 6,307,380 B1 | 10/2001 | Hirai et al. | 324/533 |
| 6,373,261 B1 | 4/2002 | Kielb et al. | 324/644 |
| 6,377,201 B1 | 4/2002 | Chu | 342/22 |
| 6,477,474 B2 | 11/2002 | Diede | 702/57 |
| 6,608,489 B2 | 8/2003 | Yankielun et al. | 324/642 |
| 6,701,783 B2 * | 3/2004 | Fehrenbach et al. | 73/290 V |
| 6,801,157 B2 * | 10/2004 | Haynes | 342/124 |

OTHER PUBLICATIONS

"Project Minitest Final Report" Work Completed under Contract AA 501031 (DG INFSO) and JRC FPV Institutional, Issued Sep. 10, 2001, 25 pages.

"The ARRL Handbook for Radio Amateurs 1993", 1992, The American Radio Relay League, Inc., Seventieth Edition, p. 16-1.

* cited by examiner

CHARACTERIZING SUBSTANCES WITH MULTISTATIC PROBES

CLAIM OF PRIORITY

This application claims priority to and the benefit of U.S. Provisional Patent Application No. 60/409,360, filed Sep. 9, 2002, the entirety of which is incorporated herein by reference.

RELATED APPLICATIONS

This is also related to the following co-pending and concurrently-filed U.S. Utility Patent Application Nos., the entirety of which are incorporated herein by reference:

Ser. No. 10/658,583, "Determining Levels of Substances Using Multistatic Probes," and Ser. No. 10/658,005, "Measuring Distances Using Multistatic Probes."

TECHNICAL FIELD

The disclosed technology relates generally to determining characteristics of substances and more particularly to determining such characteristics using multistatic probes.

BACKGROUND

Detecting the presence and characteristics of particular substances and/or combinations of substances that are difficult to inspect can provide entities interested in the control and monitoring of such substances with information critical to those entities' operations. Technology capable of such detection and characterization finds applicability in many areas, such as in, linear displacement measurement devices, position measurement, pressure analysis, land mine detection, fluid/soil contamination, fluid/gas level detection, substance composition analysis, geological mapping/imaging, and in a myriad of storage, monitoring, and processing applications.

The technologies that have been developed and applied to such detection and characterization are as diverse as their applications and include, for example, mechanical/electromechanical sensors (e.g., floats), sonic/ultrasonic sensors, radar (e.g., ground penetrating radar), time domain reflectometry sensors ("TDR"), x-ray sensors, capacitive level sensors, etc. These technologies can exhibit shortcomings that mitigate their usefulness such as, for example, floats that can be unreliable particularly in multi-fluid and/or corrosive environments; sonic/ultrasonic sensors whose acoustic signals may reflect off of foamy material or container walls and fail to capture fluidic surfaces and boundaries; radar sensors may be expensive, complex, bulky, and/or may exhibit limited resolution; TDR sensors may exhibit excessive ringing and thereby limit short range detection and may require different designs when used with different dielectric substances due to changes in reflection amplitude; x-ray sensors may fail to differentiate between similar substances; and capacitive level sensors may not operate accurately due to nonlinear dielectric properties of a substance and may fail to provide desirable information about a particular mixture. Accordingly, entities interested in residential, commercial, industrial, medical, scientific, military, and/or other applications of substance characterization technology have a continuing interest in further developing these technologies to more accurately and flexibly meet their control and monitoring objectives.

SUMMARY

The disclosed technology can be used in the development and operation of multistatic sensor probes that can characterize substances and relationships between substances. A multistatic probe can include transmitting and receiving conductive elements that are physically and/or electrically distinct and which are capable of conveying electromagnetic energy to/from a substance of interest. The transmitting and receiving conductive elements can be arranged so as to be in contact with at least one dielectric mismatch boundary associated with substances of interest, whereby an electromagnetic signal transmitted on the transmitting conductive element causes a corresponding electromagnetic signal to be conveyed on the receiving conductive element in response to the transmitted signal being in proximity to the dielectric mismatch boundary. Attributes of the received electromagnetic signal can be evaluated relative to the transmitted electromagnetic signal to determine one or more characteristics associated with at least one of the substances forming the dielectric mismatch boundary.

In one embodiment, the disclosed technology can be used to develop systems and perform methods in which an electromagnetic signal (exhibiting, for example, an ultra-wideband frequency) is formed and transmitted by a transmitter via one or more first conductive elements that are in contact with one or more dielectric mismatch boundaries, which correspond to transitional surfaces and/or regions associated with substances of interest that exhibit different dielectric constants, such as may be associated with two or more gaseous substances, vacuums, liquid substances, semi-solid substances, and/or solid substances. An electromagnetic signal based on the transmitted signal can be coupled to one or more second conductive elements (that can also be in contact with the dielectric mismatch boundaries) in response to the dielectric mismatch boundary and can be subsequently received by a receiver. The at least one first and second conductive elements can be arranged to form a parallel conductor transmission line structure, manufactured from flexible material to enable the conductive elements to substantially reform into a desirable shape/configuration, and/or exhibit substantially identical cross-sections (e.g., quadrilateral). A processing element can evaluate attributes (e.g., a time delay determined using an equivalent time sampling circuit) of the received electromagnetic signal relative to the transmitted electromagnetic signal to determine characteristics (e.g., level and/or volume of a fluid in an above-ground or below-ground storage tank) of one or more substances associated with the dielectric mismatch boundary. The processing element can also communicate one or more of the attributes of the received electromagnetic signal and/or one or more of the characteristics of the substances associated with the dielectric mismatch boundary to a local and/or remote digital data processing device during a communication session.

In one embodiment, a third conductive element connected to a ground plane can surround at least part of the at least one first and second conductive elements. The at least one first and second conductive elements can also be positioned substantially parallel to each other and substantially perpendicular to the at least one dielectric mismatch boundary.

In one embodiment, the disclosed technology can include a coupler that can operate as an electromagnetic shunt path between the at least one first and second conductive elements and can be positioned at the dielectric mismatch boundary for coupling the received electromagnetic signal independently of the dielectric properties associated with the substances forming the dielectric mismatch boundary. The coupler can, for example, exhibit a length corresponding to at least one-quarter of a propagation velocity pulse length of the transmitted electromagnetic signal. A float including a buoyant and/or a weighted component can also be provided to position the coupler relative to the at least one dielectric mismatch boundary.

In one embodiment, the disclosed technology can be used to develop systems and to perform methods for determining levels and/or volumes of substances (e.g., fluids) that may be contained in, for example, above-ground or below-ground storage tanks or other types of containers. A first electromagnetic signal (exhibiting, for example, an ultra-wideband frequency) can be formed by a transmitter and conveyed on a first conductive element that is positioned in proximity to one or more substances. When the first electromagnetic signal traverses a part of the first conductive element that is substantially adjacent to a coupler positioned at a dielectric mismatch boundary (e.g., a transitional surface and/or region between a vacuum, a gaseous substance, a liquid substance, a semi-solid substance, and/or a solid substance), a resulting change in the capacitance of the first conductive element can cause a coupling of a second electromagnetic signal (which can be, for example, based on the first electromagnetic signal) to a second conductive element. The amplitude of the second electromagnetic signal can be based on the dielectric properties of the coupler and thus can be independent of the dielectric properties associated with the substances forming the dielectric mismatch boundary. In one embodiment, the coupler can exhibit a length corresponding to at least one-quarter of a propagation velocity pulse length of the first electromagnetic signal. A processor can determine a level and/or volume of at least one of the substances based at least in part on a time delay between the first and second electromagnetic signals that can be detected by a receiver using, for example, an equivalent time sampling circuit. The processor can further communicate one or more substance levels, volumes, and/or other attributes to a local and/or remote digital data processing device via a data communications network.

In one embodiment, the first and second conductive elements can be positioned substantially parallel to each other and substantially perpendicular to the dielectric mismatch boundary. In one embodiment, the first and second conductive elements can also be flexible, form a parallel conductor transmission line structure, and/or exhibit substantially identical cross-sections (e.g., quadrilateral). In one embodiment, the disclosed technology can use a float to position the coupler at the dielectric mismatch boundary. The float can include a buoyant component and/or a weighted component.

In one embodiment, the disclosed technology can be used to develop systems and to perform methods for measuring distances between points of interest that can be associated with one or more objects. A first electromagnetic signal (exhibiting, for example, an ultra-wideband frequency), formed by a transmitter and conveyed on a first conductive element, can traverse a part of the first conductive element that is substantially adjacent to a coupler positioned at a point of interest, thereby resulting in an increase in capacitance between the first conductive element and a second conductive element along portions of these conductive elements adjacent to the coupler. The increased capacitance between these portions of the first and second conductive elements causes a second electromagnetic signal based on the first electromagnetic signal to be coupled to the second conductive element that is otherwise physically and/or electrically distinct from the first conductive element. In one embodiment, the coupler can exhibit a length corresponding to at least one-quarter of a propagation velocity pulse length of the first electromagnetic signal. A processor can execute instructions to determine a distance associated with the point of interest based at least in part on a time delay between the first and second electromagnetic signals that can be detected by a receiver using, for example, an equivalent time sampling circuit. The distance can correspond to, for example, a dimension associated with an object, a displacement between objects, an angular orientation, and/or a degree of pressure. The processor can further communicate the distance and/or data based thereon to a local and/or remote digital data processing device during a communication session.

In one embodiment, the first and second conductive elements can be flexible, form a parallel conductor transmission line stricture, and/or exhibit substantially identical cross-sections (e.g., quadrilateral). In one embodiment, the disclosed technology can also provide for a supporting material that can slidably receive the coupler in a channel defined therein and this supporting material can maintain a consistent displacement between the coupler and the first and second conductive elements.

BRIEF DESCRIPTION OF THE DRAWINGS

The foregoing discussion will be understood more readily from the following detailed description of the disclosed technology, when taken in conjunction with the accompanying drawings in which.

DETAILED DESCRIPTION

Figure 1:
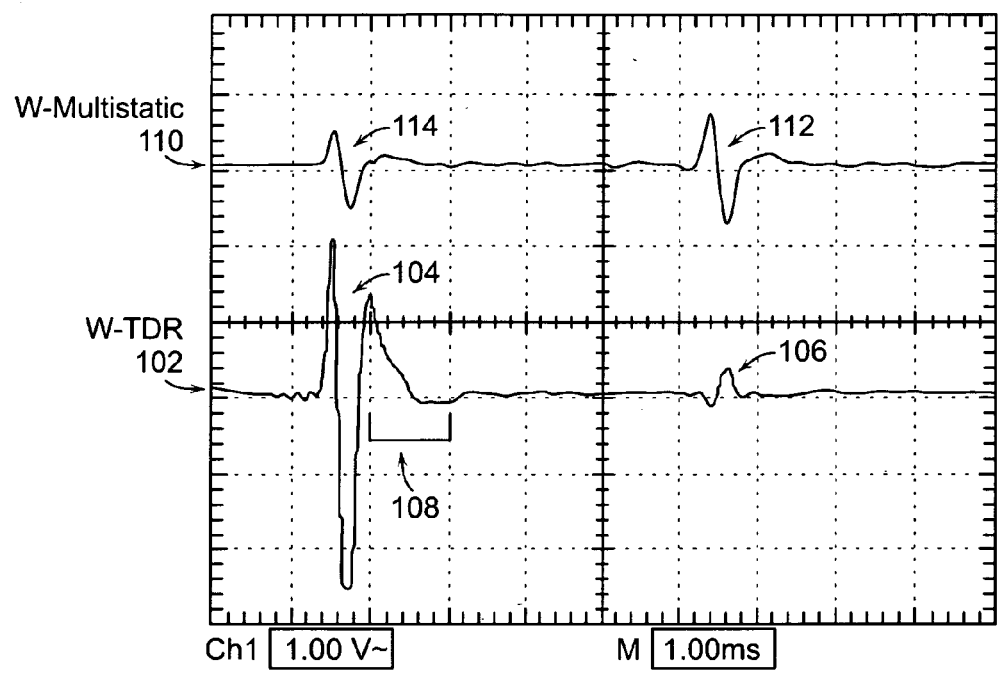
FIG. 1 illustrates exemplary waveforms of electromagnetic signals that may be encountered during the operation of multistatic and TDR probe systems.

Unless otherwise specified, the illustrated embodiments can be understood as providing exemplary features of varying detail of certain embodiments, and therefore, unless otherwise specified, features, components, processes, modules, data elements, and/or aspects of the illustrations can be otherwise combined, interconnected, sequenced, separated, interchanged, and/or rearranged without departing from the disclosed systems or methods. Additionally, the shapes, sizes, and orientations of elements are also exemplary and unless otherwise specified, can be altered without affecting the disclosed technology.

For the purposes of this disclosure, the term "substantially" can be broadly construed to indicate a precise relationship, condition, arrangement, orientation, and/or other characteristic, as well as, deviations thereof as understood by one of ordinary skill in the art, to the extent that such deviations do not materially affect the disclosed methods and systems.

Time Domain Reflectometry (TDR) refers to a technology that has been applied in the characterization of substances and involves transmitting an electromagnetic signal on a conductive element (e.g., a transmission line) immersed in or otherwise in contact with a substance of interest, while simultaneously monitoring the same conductive element for corresponding electromagnetic signals that are reflected along the conductive element. A conductive element can be understood to be capable of conveying electromagnetic signals and can be, for example, a structure of substantially constant cross-section. Electromagnetic signals can be reflected along the same conductive element in response to changes in the conductive element's characteristics (e.g., impedance) that may be affected by substances that are in contact with the conductive element at particular locations along its length.

For example and with reference to the exemplary waveform 102 (labeled as W-TDR) measured on a typical TDR probe in FIG. 1, at least part of an electromagnetic signal 104 transmitted on a transmission line immersed in a tank or other container containing air and a liquid (e.g., water) substance will be reflected along the transmission line when the electromagnetic signal 104 encounters the change in the transmission line's impedance that occurs above and below the dielectric mismatch boundary between the air and the liquid. The amplitude of the reflected signal 106 is related to the difference in impedance (referred to as a reflection coefficient) and thus to a difference in the dielectric constants of the substances forming the dielectric mismatch boundary. A dielectric mismatch boundary can refer generally to a surface or region between substances that exhibit different dielectric constants. A dielectric constant of a substance can refer to a measure of the ability of that substance to store energy in an electric field relative to the permittivity of free space and can therefore be used to identify and/or otherwise characterize a substance of interest. Analysis of the time differential between the transmitted and reflected electromagnetic signals 104, 106 can be used to determine the location of the dielectric mismatch boundary and can thus, for example, ascertain the level of the liquid in the tank.

Similarly, substances in contact with the transmission line can change the velocity of propagation of the electromagnetic signal along the transmission line, which can be used to determine not only the level of the substances, but also their dielectric constants. A velocity of propagation can refer to a ratio of the velocity of light to the square root of a product of the relative permeability (capability of storing energy in a magnetic field) and effective dielectric constant (expressed with respect to an electric field associated with a signal on a non-shielded transmission line) of the transmission line.

Unfortunately, TDR systems typically exhibit interference (e.g., ringing, saturation, etc.) that may interfere with the reception/measurement of the reflected signal 106, particularly in situations where the location of the source of the transmitted signal 104 is close to the dielectric mismatch boundary, due to concurrent monitoring of the same transmission line by receiver-side circuitry that is normally subjected directly to the output of a transmitter-side circuit that produced the transmitted electromagnetic signal 104. For example, if the location of the transmitter-side circuitry and the dielectric mismatch boundary were such that the reflected signal 106 occurred during an interference zone 108, then the relatively small amplitude of the reflected signal 106 may be insufficient to overcome the degree of interference and thus the receiver-side circuitry may fail to detect the reflected signal 106. Further, the design of a TDR probe/device may limit the application of that device to specific applications, thereby reducing the overall usability of the device as substances, dielectric constants, and other environmental and/or operational factors are changed.

The disclosed technology can reduce, if not eliminate, these TDR shortcomings by using electrically-separate transmit and receive conductive elements. Sensor probes that are constructed with one or more transmit conductive elements that are electrically-separate from one or more receive conductive elements will hereinafter be referred to as being multistatic.

In brief overview and with reference to the exemplary waveform 110 (labeled as W-Multistatic) measured on a receive conductive element of an exemplary multistatic probe in FIG. 1, a transmitter of a multistatic probe can produce an electromagnetic signal (not shown) that is conveyed along the length of a transmit conductive element. When the transmitted signal encounters a dielectric mismatch boundary formed between substances in contact with and/or otherwise adjacent to the transmit conductive element, a resulting change in the capacitance between the transmit conductive element and a receive conductive element (transmit and receive conductive elements are electrically separate) causes at least part of the transmitted signal to be coupled to the electrically distinct, receive conductive element. Coupling of electromagnetic energy between the transmit and receive conductive elements corresponds to an amount of signal transfer action, expressed, for example, as a coupling coefficient, that is at least partly based on the spacing and impedances between the transmit and receive conductive elements in the vicinity of the dielectric mismatch boundary that caused the coupled signal 112. The coupled signal 112 can be conveyed along the receive conductive element, which is monitored by a receiver that can detect and further manipulate the coupled signal without substantial interference caused by the signal transmitted on the electrically-separate transmit conductive element, thereby resulting in improved performance relative to traditional TDR techniques and enhanced detection capabilities, particularly when encountering multiple dielectric mismatch boundaries, close distance measurements, and/or dielectric mismatch boundaries formed by substances with similar dielectric constants. Those skilled in the art will recognize that parasitic capacitance between the transmit and receive conductive elements and circuit impedance mismatches between transmitter and receiver circuits (for embodiments in which the transmitter and receiver circuits are positioned on a single circuit board and not completely isolated) can cause a parasitic signal 114 to appear on the receive conductive element, however the small amplitude of this parasitic signal 114 relative to that of the coupled signal 112 does not materially affect the ability of the receiver to detect the coupled signal 112, even in close-in situations where the dielectric mismatch boundary is located close to the source of the transmitted signal.

In more detail and with reference to FIG. 2, an entity interested in monitoring and/or controlling the level, volume, and/or other characteristics of one or more substances 202, 204, 206 in an open or closed container 208 (e.g., above-ground tank, below-ground tank, under-water tank, pressurized tank, and/or any other type of container capable of storing one or more substances) can, under the control of a processor 210, instruct a transmitter 212 to transmit an electromagnetic signal 214 via one or more transmit conductive elements 216 in contact with one or more substances of interest 202, 204, 206. In one illustrative embodiment, the transmitted signal 214 can exhibit an ultra-wide band frequency. At least part of the transmitted signal 214 can be coupled to a receive conductive element 218 in response to the transmitted signal 214 encountering dielectric mismatch boundaries, such as the dielectric mismatch boundary 220 associated with substance A 202 and substance B 204 and the dielectric mismatch boundary 222 associated with substance B 204 and substance C 206. The coupled signal 224 returned along the receive conductive element 218 can be received by a receiver 226 and subsequently processed by the processor 210 using a time source 228 to perform, for example, a time comparison analysis between the transmitted signal 214 and the received signal 224 that can be used to ascertain one or more characteristics of the substances of interest 202, 204, 206. The processor 210 can also communicate and/or display the substance characteristics on one or more local and/or remote digital data processing devices 230 via a data communications network 232, bus, and/or other type of digital or analog data path.

A substance 202-206 can refer generally to any type of gaseous, liquid, gel, semi-solid, and/or solid matter, as well as, to any solutions, mixtures, compositions and/or combinations thereof that exhibit discernable dielectric properties. As discussed above, a dielectric mismatch boundary 220, 222 can refer generally to a surface or region between substances that exhibit different dielectric constants. For the purposes of this disclosure, a dielectric mismatch boundary can also refer to a boundary between a total or partial vacuum and a substance.

A processor 210 can refer to the digital logic circuitry that responds to and processes instructions (not shown) that drive digital data processing devices 230, multistatic probes 200, transmitters 212, time sources 228, receivers 226, etc., and can include, without limitation, a central processing unit, a micro-controller, an arithmetic logic unit, an application specific integrated circuit, a task engine, and/or any combinations, arrangements, or multiples thereof.

The instructions executed by a processor 210 represent, at a low level, a sequence of "0's" and "1's" that describe one or more physical operations of a digital data processing device and/or multistatic probe system 200. These instructions can be pre-loaded into a programmable memory (not shown) (e.g., EEPROM) that is accessible to the processor 210 and/or can be dynamically loaded into/from one or more volatile (e.g., RAM, cache, etc.) and/or non-volatile (e.g., FLASH ROM, hard drive, etc.) memory elements communicatively coupled to the processor 210. The instructions can, for example, correspond to a) the initialization of hardware within a digital data processing device and/or a multistatic probe system 200, b) an operating system that enables the hardware elements to communicate under software control and enables other computer programs to communicate, and/or c) software application programs or other computer programs that are designed to perform particular functions for an entity, such as functions relating to the operation of the multistatic probe system 200 (e.g., monitor a level and/or a moisture content of a substance of interest).

A digital data processing device 230 can be a personal computer, computer workstation (e.g., Sun, HP), laptop computer, server computer, mainframe computer, handheld device (e.g., personal digital assistant, Pocket PC, cellular telephone, etc.), information appliance, or any other type of generic or special-purpose, processor-controlled device capable of receiving, processing, and/or transmitting digital data. As is known to those skilled in the art, a digital data processing device can include a variety of subsystems (e.g., display subsystem, video subsystem, input/output subsystem, memory subsystem, storage controller subsystem, network interface subsystem, etc.) and software processes (e.g., operating system, software application programs, database, etc.) executing thereon.

A local user (not shown) can interact with a processor 210 of a multistatic probe system 200 and/or with a digital data processing device 230 in communication therewith by, for example, viewing a command line, LED display, graphical, and/or other user interface and entering commands via an input device, such as a mouse, keyboard, touch sensitive screen, track ball, keypad, etc. The user interface can be generated by a graphics subsystem of a digital data processing device, which renders the interface into an on or off-screen surface (e.g., in a video memory and/or on a display screen). Inputs from the user can be received via an input/output subsystem and routed to a processor 210 via an internal bus (not shown) (e.g., system bus) for execution under the control of an operating system.

Similarly, a remote user (not shown) can interact with a processor 210 of a multistatic probe system 200 and/or with a digital data processing device 230 in communication therewith over a data communications network 232 (e.g., Internet, intranet, extranet, local area network, metropolitan area network, wide area network, radio frequency modem, etc.). The inputs from the remote user can be received and processed in whole or in part by a remote digital data processing device collocated with the remote user. Alternatively or in combination, the remote user's inputs can be transmitted back to and processed by the processor 210 and/or by the digital data processing device located in proximity thereto via one or more networks using, for example, thin client technology. The user interface of the local digital data processing device can also be reproduced, in whole or in part, at the remote digital data processing device collocated with the remote user by transmitting graphics information to the remote device and instructing the graphics subsystem of the remote device to render and display at least part of the interface to the remote user.

Network communications between two or more processors and/or digital data processing devices typically require a network subsystem (as embodied in, for example, a network interface card, a modem, a satellite data modem, etc.) to establish one or more communication sessions between the processors/devices. A communication session can refer to a series of interactions between two or more processors/devices and/or other types of communication end points that occur during the span of a connection and can require the use of multiple elements of a data communications network, a point to point connection, a bus, a wireless transceiver (e.g., radio frequency modem) and/or any other type of digital and/or analog data path capable of conveying processor-readable data.

A data communications network 232 can comprise a series of network nodes (e.g., the processor 210, a local digital data processing device, and/or a remote digital data processing device 230) that can be interconnected by network devices and communication lines (e.g., public carrier lines, private lines, satellite lines, etc.) that enable the network nodes to communicate. The transfer of data (e.g., messages pertaining to characteristics of substances of interest 202-206) between network nodes can be facilitated by network devices, such as routers, switches, multiplexers, bridges, gateways, etc., that can manipulate and/or route data from a source node to a destination node regardless of any dissimilarities in the network topology (e.g., bus, star, token ring), spatial distance (local, metropolitan, or wide area network), transmission technology (e.g., TCP/IP, Systems Network Architecture), data type (e.g., data, voice, video, or multimedia), nature of connection (e.g., switched, non-switched, dial-up, dedicated, or virtual), and/or physical link (e.g., optical fiber, coaxial cable, twisted pair, wireless, etc.) between the source and destination network nodes.

As known to those of ordinary skill in the art, a transmitter 212 (also referred to as transmitter-side circuitry) can refer to digital and/or analog circuitry that can receive instructions from and provide status to a processor 210 (via, for example, a digital-to-analog or analog-to-digital converter), form one or more electromagnetic signals 214 at a frequency and amplitude specified by the processor 210, and/or transmit the electromagnetic signals 214 along one or more transmit conductive elements 216. In one illustrative embodiment, the transmitter uses clock signals (which can exhibit, for example, a frequency range of between about 2 MHz to 8 MHz, such as a square-wave at 3.665 MHz) received from a pulse rate frequency clock in the time source 228 to perform at least some of its operations.

As known to those of ordinary skill in the art, a receiver 226 (also referred to as receiver-side circuitry) can refer to digital and/or analog circuitry that can receive instructions from and provide status and/or signal information to a processor 210 (via, for example, a digital-to-analog or analog-to-digital converter), and/or amplify, filter, and digitally sample the return signal 224 received via the receive conductive element 218.

As known to those of ordinary skill in the art, a time source 228 can refer to digital circuitry that can, for example, provide a pulse rate, variable-delayed frequency clock that operates on an equivalent time sampling detector that may be contained within a receiver 226 and which can detect and/or be used to construct a representation of the received signal 224. In one illustrative embodiment, the time source 228 can include a delay controller, such as a voltage integrator op-amp ramp circuit with capacitor discharge reset to produce a precise linear time ramp for the delay circuit.

As known to those of ordinary skill in the art, transmit and receive conductive elements 216, 218 can refer to structures capable of conveying electromagnetic energy, such as coaxial-arranged conductors, dielectric rods, microstrip lines, coplanar striplines, coplanar waveguides, etc. The transmit and receive conductive elements 216, 218 can also form a parallel conductor transmission line structure. Although the multistatic probe is illustrated with the transmitter 212 and receiver 226 connected to corresponding ends of the transmit and receive conductive elements 216, 218, those skilled in the art will recognize that the transmitter 212 and receiver 226 can also be applied to opposite ends of their respective conductive elements 216, 218 to, for example, measure a velocity of propagation associated with one or more substances 203, 204, 206.

Figure 2:
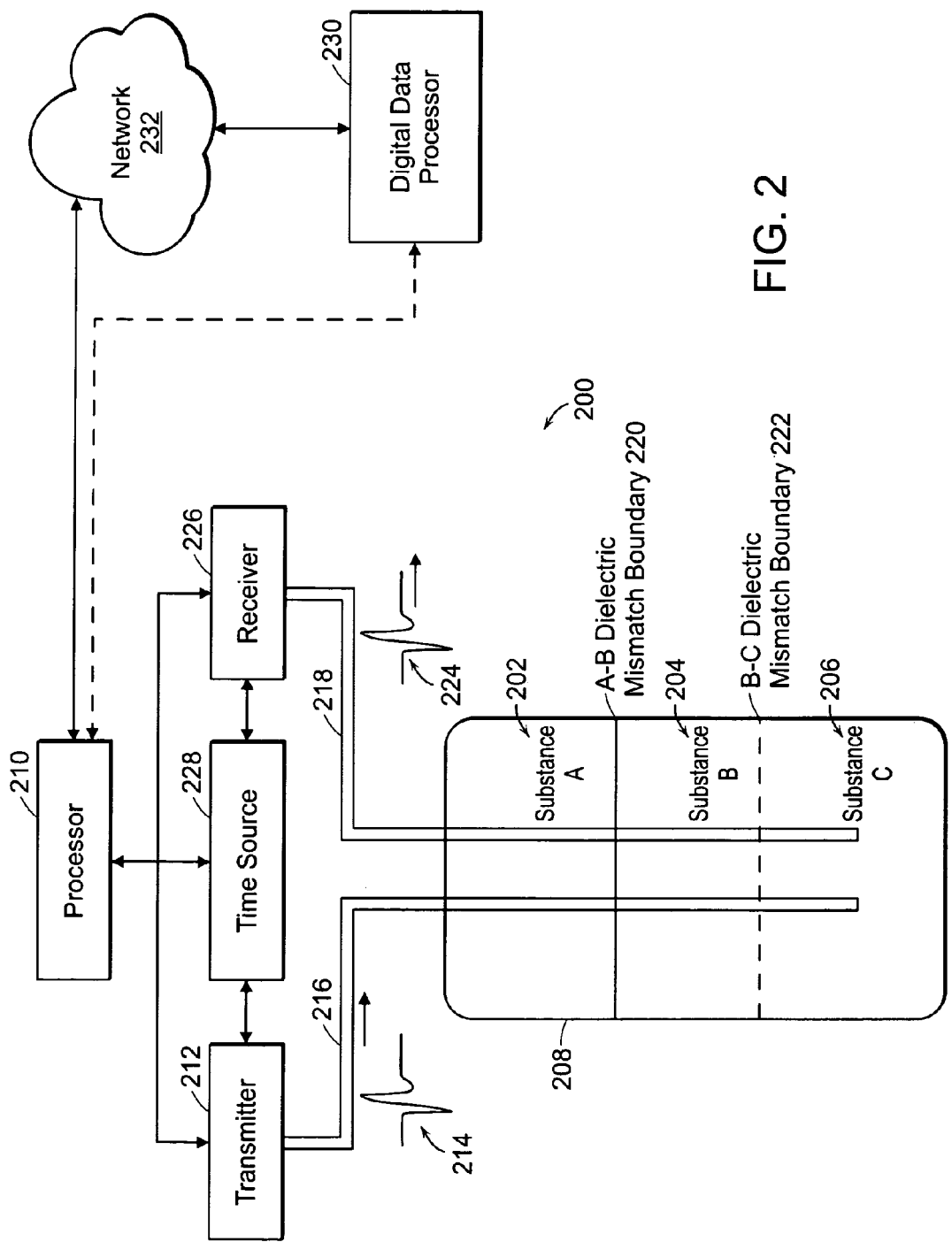
FIG. 2 schematically illustrates exemplary elements of a multistatic probe system.

Similarly, the transmit and receive conductive elements 216, 218 are illustrated in FIG. 2 as exhibiting substantially the same characteristics (e.g., length), but those skilled in the art will recognize that their width, length, orientation, or other characteristics can vary. In one embodiment, the characteristics of the transmit and receive conductive elements 216, 218 can be varied, while their transmission line impedance remains substantially constant. In another embodiment, their characteristics can be varied according to a predetermined arrangement for impedance matching and/or to obtain a desirable signal response (e.g., a coupled return at a predetermined point on the probe that can serve as a point of reference). For example, the receive conductive element 218 can extend to different depths in the tank 208 containing the substances of interest 202-206 than the illustrated transmit conductive element 216 (or vice verse), the transmit and receive conductive elements 216, 218 can be substantially parallel and equidistant and/or they can exhibit different orientations, the transmit and receive conductive elements 216, 218 can be substantially perpendicular to the dielectric mismatch boundaries 220, 222 or they can exhibit other angular offsets. the transmit and receive conductive elements 216, 218 can exhibit substantially identical cross-sections (e.g., quadrilateral) or they can exhibit different cross-sections, and/or at least part of the transmit and/or receive conductive elements 216, 218 can be shielded or unshielded, terminated or unterminated, etc.

Further and although only a single transmit conductive element 216 and a single receive conductive element 218 are shown in FIG. 2 to retain the clarity of the figure, those skilled in the art will recognize that more than one transmit conductive element 216 and receive conductive element 218 can be provided. In one embodiment, a plurality (e.g., two or more) of transmit conductive elements 216 and receive conductive elements 218 can be connected to a single transmitter 212 and a single receiver 226, respectively. In another embodiment, a plurality of transmit conductive elements 216 and receive conductive elements 218 can be connected to more than one transmitter 212 and more than one receiver 226, respectively. In one embodiment, a multistatic probe 200 can include a third conductive element (not shown) that substantially surrounds at least part of the transmit and receive conductive elements 216, 218 and which can function as an electromagnetic shield, mechanical wear protection, and/or as a stiffening/strengthening member for the overall probe 200. In one embodiment, the third conductive element can be connected to a ground plane associated with, for example, the receiver 226.

Figure 3:
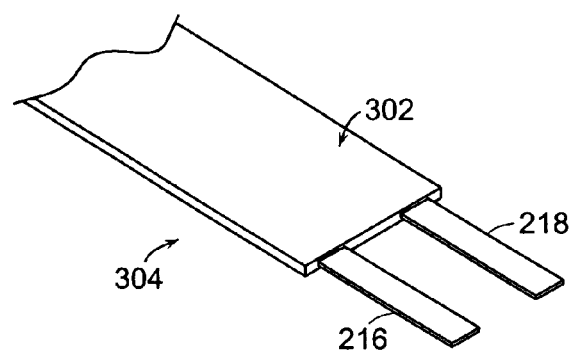
FIG. 3 illustrates an exemplary embodiment of a parallel coplanar strip transmission line that may be used as an element of the multistatic probe system of FIG. 2.

In one illustrative embodiment and with reference to FIG. 3, a multistatic probe 200 can include a parallel coplanar strip transmission line with an insulating spacer 302 that can maintain a substantially equidistant position between a transmit conductive element 216 and a receive conductive element 218. The insulating spacer 302 and transmit and receive conductive elements 216, 218 can be composed of materials that are non-absorptive and that are resistant to chemicals, temperature, and material build-up on their surfaces and can thereby maintain an effective dielectric constant. The material forming the insulating spacer 302 and transmit and receive conductive elements 216, 218 can also be selected to exhibit flexible properties (e.g., with comparatively minor shape memory) that can withstand rolling, folding, kinking, etc., so that the spacer 302 and conductive elements 216, 218 reform into their original shapes upon cessation of the forces that caused their deformation. For example, the insulating spacer 302 can be composed of polytetrafluoroethylene (manufactured using, for example, a lamination process), fluorinated ethylenepropylene (manufactured using, for example, a co-extrusion process), a polyimide, such as Teflon or Kapton (manufactured using, for example, a co-extrusion process), and the transmit and/or receive conductive elements 216, 218 can be made of stainless steel (e.g., type 304 or 316).

In one embodiment, the insulating spacer 302 can be provided in the form of a laminated tape or film that can substantially surround at least part of the transmit and receive conductive elements 216, 218. In one particularly advantageous embodiment, the transmit and receive conductive elements 216, 218 can be approximately 0.1 inches wide and 0.004 inches thick and the insulating spacer 302 substantially surrounding at least part of the transmit and receive conductive elements 216, 218 can fixedly space the conductive elements 216, 218 by about 0.305 inches with an approximate overall width and thickness of the resulting spacer-conductor assembly 304 of 0.5 inches and 0.025 inches, respectively. Those skilled in the art will recognize that the "flat" conductive elements and high quality dielectric exhibited by the insulating spacer of this particular illustrative embodiment can result in comparatively low signal loss, reduced levels of cross-talk between conductive elements, substantially constant impedance that can reduce the attenuation and dispersion of an electromagnetic signal, and/or improved sensitivity to a dielectric mismatch boundary.

In one embodiment, at least part of an end of the spacer-conductor assembly 304 can be attached to a weight that may be useful in maintaining a desired configuration of the assembly 304. For example, the weight can be a corrosion resistant element that maintains the spacer-conductor assembly 304 in a substantially vertical position and/or the weight can include a magnet that anchors the end of the spacer-conductor assembly 304 to a desired location within a container 208 storing the substances of interest 202-206, such as on a bottom or a wall of the container 208.

Figure 4:
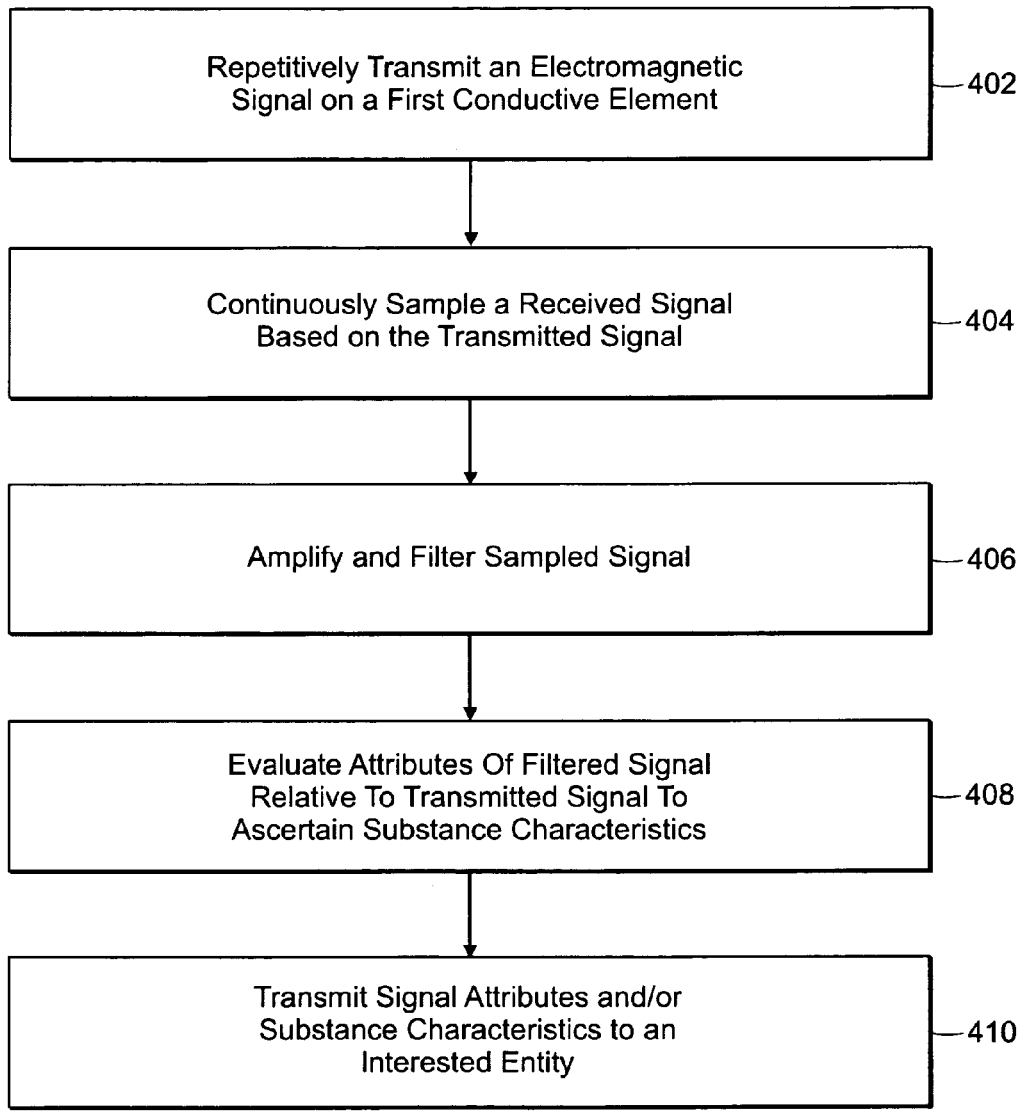
FIG. 4 illustrates an exemplary methodology that may be performed during the operation of the multistatic probe system of FIG. 2.

In an illustrative operation and with reference to FIGS. 2 and 4, a processor 210 can instruct a transmitter 212 to form an electromagnetic signal of interest. In response to the processor instructions, the transmitter 212 can access a pulse rate frequency clock associated with a time source 228 to form an electromagnetic signal 214 exhibiting the attributes (e.g., amplitude and frequency) specified by the processor 210 and can transmit such signal 214 on at least one first conductive element 216 (402). In another embodiment, the processor does not specify attributes of the electromagnetic signal 214, but rather instructs/triggers other circuitry to form the electromagnetic signal 214 and/or performs timing measurements on signals conditioned and/or filtered by other circuitry.

When the transmitted signal 214 (e.g., one or more electromagnetic pulses exhibiting, for example, an ultra-wide band frequency) encounters one or more regions of the first conductive element that is/are in contact with, and/or otherwise adjacent to, one or more dielectric mismatch boundaries 220, 222, a change in the capacitance of the first conductive element 216 relative to a second conductive element 218 couples at least part of the transmitted signal 214 to one or more second conductive elements 218. Under the control of the processor 210, the coupled signal 224 (e.g., one or more electromagnetic pulses exhibiting, for example, an ultra-wide band frequency) that is based on/excited from the transmitted signal 214 can be sampled by the receiver 226 using a controlled time delay of the pulse rate frequency clock of the time source 228 to form a representation of the coupled signal 224 (404). The coupled signal and/or the representation of the coupled signal can also be amplified to increase the amplitude of the signal and/or filtered to remove harmonics and other interfering signals, such as signals from parasitic coupling between the transmitter and receiver-side circuitry located on a common printed circuit board, signals coupled from reflections on the first conductive element 216, etc. (406).

The amplified and filtered return signal can be processed by the processor 210 and/or receiver 226 relative to the transmitted signal 214 to determine attributes (e.g., a time delay) that can be used to derive characteristics (e.g., level and/or volume of a substance) associated with the substances 202-206 that formed the dielectric mismatch boundary 220, 222 (408). The processor 210 can subsequently transmit and/or otherwise communicate the attributes of the return signal and/or the characteristics of the substances 202-206 to an interested entity, such as to a local digital data processing device, a remote digital data processing device 230, an LED display, a computer program, and/or to any other type of entity capable of receiving the attribute and/or characteristic information (410).

Those skilled in the art will recognize that, even with the enhanced performance of the multistatic probe 200 discussed above, it may be difficult to characterize adjacent substances that exhibit similar dielectric constants, where such conditions could result in, for example, a relatively low amplitude in the coupled signal 224, and/or where the transmit-to-receive time between the transmitted signal 214 and coupled signal 224 is comparatively small (which may, for example, experience interference from parasitic coupling). Accordingly and optionally, the disclosed technology can include a coupler composed at least in part of a material exhibiting a comparatively high dielectric constant (e.g., ceramics, plastics, etc.), conductive properties (e.g., metals, metallized materials, ferrites, etc.), and/or other properties that can be positioned at the dielectric mismatch boundary and that can create a coupled return signal 224 of substantially consistent attributes (e.g., amplitude), which is independent of the dielectric properties of the substances forming the dielectric mismatch boundary.

Figure 5:
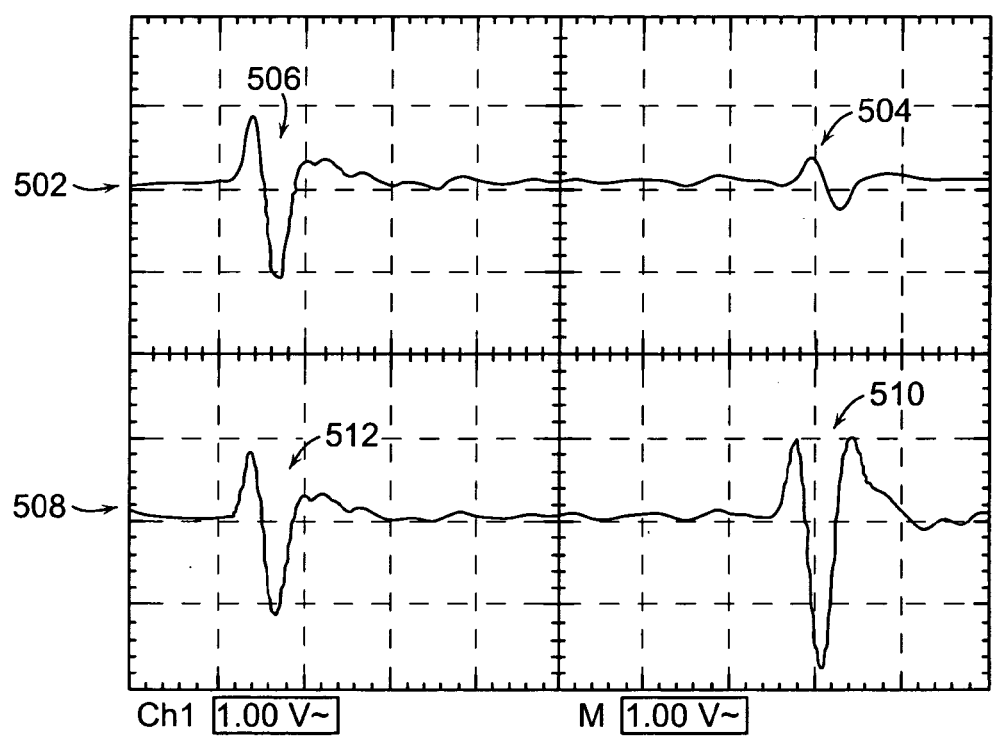
FIG. 5 illustrates exemplary waveforms of electromagnetic signals that may be encountered during the operation of multistatic probe systems, in the absence of and in the presence of couplers.

For example and with reference to an exemplary waveform 502, measured on a receive conductive element of an exemplary multistatic probe that traverses a dielectric mismatch boundary formed between substances with similar dielectric constants (e.g., air and mineral oil), in FIG. 5, the amplitude of a coupled signal 504 excited on the receive conductive element can be low relative to that of a corresponding transmit signal conveyed on a transmit conductive element and, thus, it may be difficult for a receiver to detect the coupled signal 504 (particularly in close-in situations where the coupled signal 504 may be partially obscured by a parasitic signal 506, as previously described). As shown in waveform 508, a coupler positioned at the same dielectric mismatch boundary results in a coupled signal 510 that is independent of the dielectric constants of the substances forming the dielectric mismatch boundary and can therefore result in a higher amplitude relative to that of the coupled signal 504 when a coupler is not used. Accordingly, the likelihood that the receiver will be able to detect the coupled signal 510 is improved and the enhanced signal strength of the coupled signal 510 is also less likely to be obscured by a parasitic signal 512.

Figure 6A:
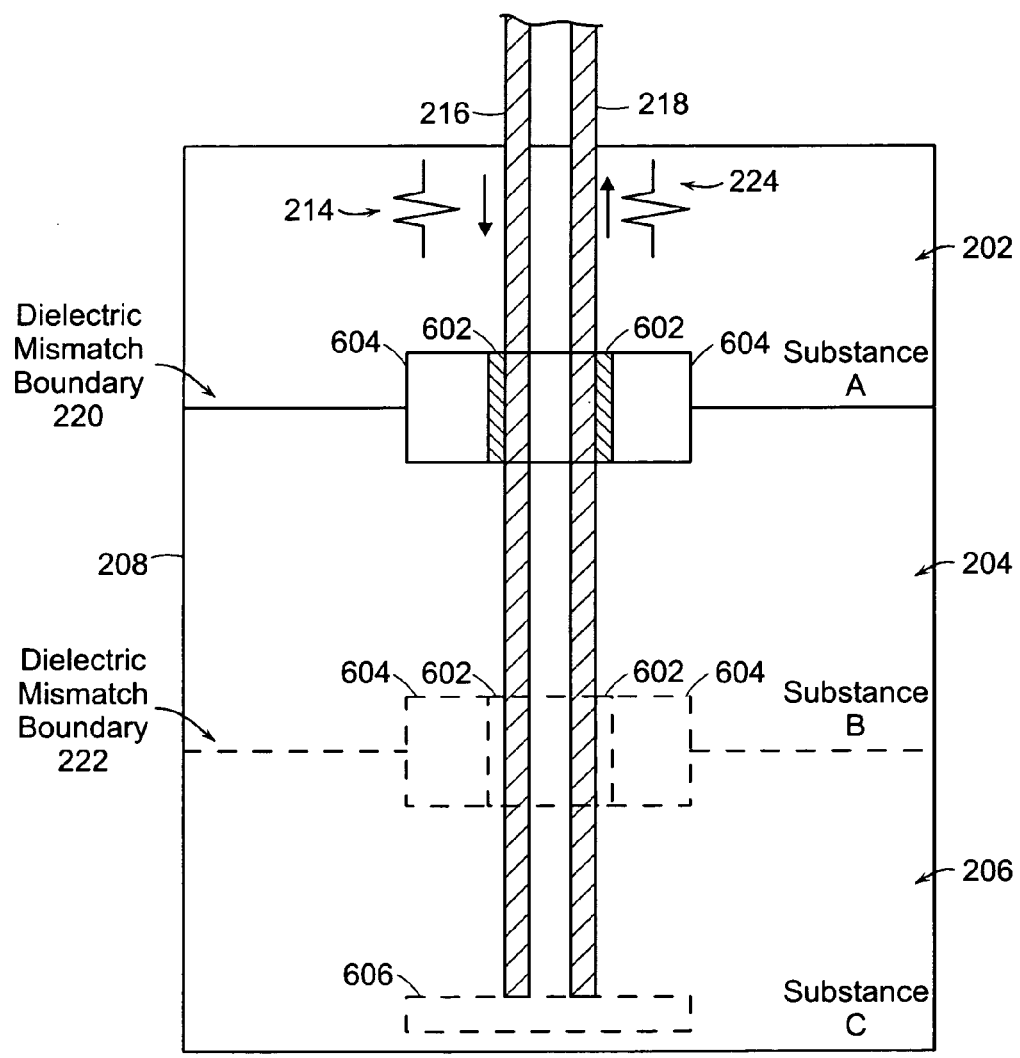
FIG. 6A schematically illustrates an exemplary use of a float, a coupler, and/or a weight with the multistatic probe system of FIG. 2.

With reference to FIG. 6A, one or more couplers 602 can be attached to one or more floats 604 (forming, for example, one or more float-coupler assemblies), which can enable the couplers 602 to slidably move along the transmit and/or receive conductive elements 216, 218 and be positioned at substantially the same locations as dielectric mismatch boundaries 220, 222 formed between substances of interest 202-206. An electromagnetic signal 214 transmitted along the transmit conductive element 216 can induce and/or excite a coupled electromagnetic signal 224 on the receive conductive element 218 upon traversing that section of the transmit conductive element 216 in close proximity to the coupler 602, as previously discussed. Since the amplitude of the coupled signal 224 is based at least in part on the relatively high dielectric properties of the coupler 602 located at a dielectric mismatch boundary 220, 222 and not on the dielectric properties of the substances of interest 202-206 forming such boundary 220, 222, the coupled signal 224 can still be considered to be based on a location of the dielectric mismatch boundary 220, 222. Those skilled in the art will recognize that a more accurate determination of the location of the dielectric mismatch boundary 220, 222 can be obtained by also correcting for the velocity of propagation changes of the signals 214, 224 caused by the difference in the dielectric constants of the substances 202-206.

Those skilled in the art will recognize that the properties (e.g., density, viscosity, etc.) of the substances of interest 202-206 can be used to determine the buoyant properties and other characteristics (e.g., size, shape, etc.) of a float-coupler assembly (may also include an optional weight 606 connected to the float-coupler assembly or transmit/receive conductive elements 216, 218), which can be used to select a particular float-coupler assembly, such that the coupler 602 can be positioned at substantially the same location as a dielectric mismatch boundary 220, 222. Although the coupler 602 is shown as having a length identical to that of the float 604, those skilled in the art will recognize that the coupler 602 can have a length that is greater or smaller than that of the float 604. In one embodiment, the coupler 602 can have a length that corresponds to at least one-quarter of a pulse length of the transmitted signal 214.

Figures 1, 6B:
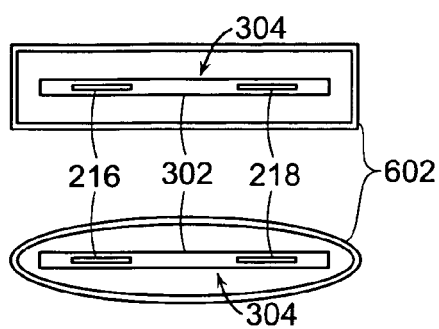
FIG. 6B schematically illustrates exemplary cross-sections of the coupler of FIG. 6A when used with the transmission line structure of FIG. 3.
Figures 2, 6B:
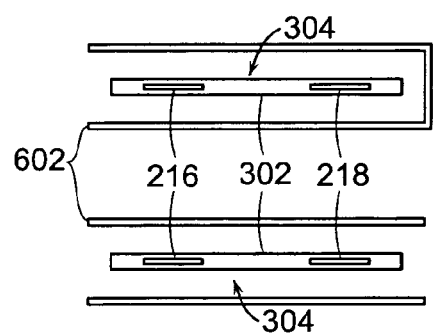
Figures 3, 6B:
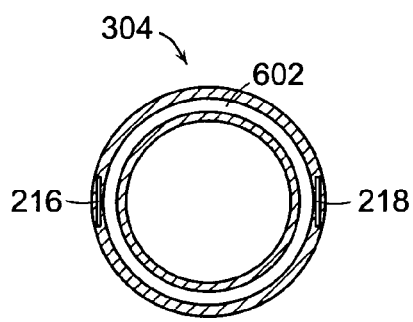

With reference to FIG. 6B, a coupler 602, such as a metallic sleeve, can exhibit a quadrilateral, circular, oval, U-shaped, parallel segment, and or other shaped cross-section that can form a channel capable of accepting the spacer-conductor assembly 304 shown in FIG. 3 and/or other types of spacer-conductor assemblies. In one illustrative embodiment, the float-coupler assembly can be formed by stacking stainless steel sheets with quadrilateral channels defined therein and inserting the stacked sheets into a closed-cell, Buna-N, Nitrol rubber float, where the quadrilateral channels are dimensioned to provide sufficient clearance so that the float-coupler assembly can move freely along the spacer-conductor assembly 304 (FIG. 3) inserted therethrough. Those skilled in the art will also recognize that a float 604 with an internal channel whose walls exhibit a similar conductive path, such as a metal passage in a metal float, can be used in place of, or in addition to, the coupler 602.

As discussed herein, the disclosed technology can be used to develop a variety of measurement devices that can measure, for example, levels and other characteristics of substances stored in a container; the dimensions of an object; a distance between objects; an angular orientation; a position of a hydraulic cylinder, a degree of compression of a spring in a weight measuring device, a displacement of a bellows or diaphragm in a pressure measuring device; and/or other types of devices that can exhibit changing states.

Figure 7A:
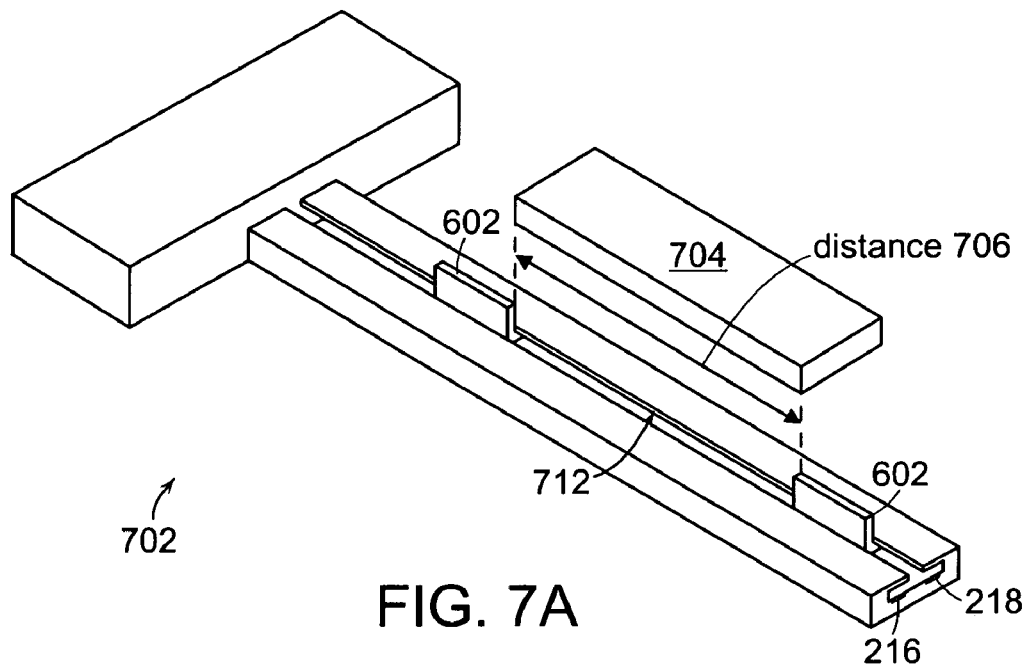
FIG. 7A schematically illustrates an exemplary embodiment of a multistatic probe system when used as a linear distance measurement device.

In one illustrative embodiment and with reference to FIG. 7A, the disclosed technology can be used to develop a measurement device 702 capable of measuring linear distances associated with one or more objects 704 by, for example, aligning one or more movable couplers 602 with the positions of interest on the object(s), transmitting an electromagnetic signal 214 on a first conductive element 216, receiving one or more coupled electromagnetic signals 224 on an at least one electrically separate second conductive element 218 in response to the transmitted signal 214 traversing those sections of the transmit conductive element 216 in close proximity to the couplers 602, and evaluating the attributes of the coupled signals 224 relative to the transmitted signal 214 to determine a distance 706 between the positions of interest.

Figure 7B:
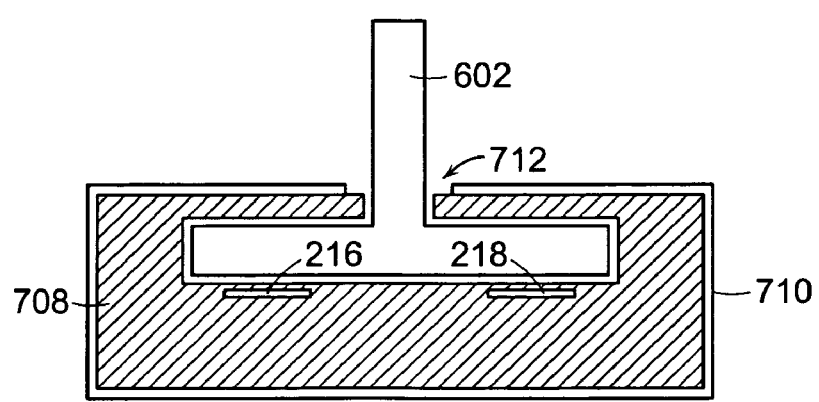
FIG. 7B schematically illustrates an exemplary cross-section of the linear distance measurement device of FIG. 7A.

With reference now also to FIG. 7B, the measurement device 702 can include one or more transmit and receive conductive elements 216, 218 positioned and/or otherwise integrated within a plastic or other suitable supporting material 708, which may be at least partially surrounded by a third conductive element 710 that may be connected to a ground plane and/or provide strength/rigidity to the measurement device 702. The supporting material 708 can include a channel 712 defined therein in close proximity to the transmit and receive conductive elements 216, 218 and adapted to receive the slidably movable couplers 602.

Although the disclosed technology has been described with reference to specific embodiments, it is not intended that such details should be regarded as limitations upon the scope of the invention, except as and to the extent that they are included in the accompanying claims.

What is claimed is:

1. A system comprising:
    at least one first conductive element and at least one second conductive element;
    a transmitter conductively coupled to at least one said first conductive element without also being conductively coupled to any said second conductive element, the transmitter being operable to drive a first electromagnetic signal along the at least one first conductive element;
    a receiver for receiving signals from the at least one second conductive element; and
    a coupler, mounted for so sliding through a range of positions with respect to the first and second conductive elements as to respond to the first electromagnetic signal by launching on the second conductive element a second electromagnetic signal received by the receiver with a timing with respect to the first electromagnetic signal that depends on the coupler's position; and
    a processing element responsive to the second electromagnetic signal to generate, at least in part from the second magnetic signal's time delay with respect to the first electromagnetic signal, an output indicative of the value of a quantity on which the coupler's location depends.

2. The system of claim 1 further comprising a third conductive element surrounding at least part of the at least one first and second conductive elements and being connected to a ground plane.

3. The system of claim 1 wherein the at least one first and second conductive elements are positioned substantially parallel to each other.

4. The system of claim 1 wherein at least one of the first and second electromagnetic signals exhibits an ultra-wide-band frequency.

5. The system of claim 1 wherein at least one of the first and second conductive elements is flexible.

6. The system of claim 1 wherein the first and second conductive elements exhibit quadrilateral cross-sections.

7. The system of claim 1 wherein the first and second conductive elements exhibit substantially identical cross-sections.

8. The system of claim 1 wherein the coupler operates as an electromagnetic shunt path between the at least one first and second conductive elements.

9. The system of claim 1 further comprising:
a float for positioning the coupler.

10. The system of claim 9 wherein the float includes a buoyant component and a weighted component.

11. The system of claim 1 further comprising a supporting material for slidably receiving the coupler in a channel defined therein, the supporting material maintaining a consistent displacement between the coupler and the first and second conductive elements.

12. The system of claim 1 wherein the quantity whose value the output represents is the level of a fluid.

13. A method comprising:
providing a coupler, mounted for so sliding through a range of positions with respect to first and second conductive elements as to respond to a first electromagnetic signal propagating along the first conductive element by launching on the second conductive element a second electromagnetic signal whose timing with respect to the first electromagnetic signal depends on the coupler's position;
driving a first electromagnetic signal by conductive coupling on the first conductive element without also driving the second conductive element by conductive coupling;
receiving from the second conductive element the second electromagnetic signal thereby launched on the second conductive element;
determining the value of a quantity on which the coupler's position depends at least in part by evaluating a time delay of the second electromagnetic signal relative to the first electromagnetic signal; and
generating an output signal dependent upon the quantity's value thus determined.

14. A method as defined in claim 13 wherein the coupler exhibits a length corresponding to at least one-quarter of a propagation-velocity pulse length of the first electromagnetic signal.

15. The method of claim 14 further comprising:
providing a float for positioning the coupler.

16. The method of claim 13 wherein the distance corresponds to a dimension associated with an object.

17. The method of claim 13 wherein the distance corresponds to a displacement between a plurality of objects.

18. The method of claim 13 wherein the distance corresponds to an angular orientation.

19. The method of claim 13 wherein the distance corresponds to a degree of pressure.

20. The method according to claim 13, wherein the coupler so couples the first and second conductive elements as to launch the second electromagnetic signal along the second conductive element when the first electromagnetic signal reaches the position of the coupler, and wherein the coupler is slidable along the first and second conductive elements.

21. The method according to claim 13, wherein the first electromagnetic signal propagates from a first end of the first conductive element toward a second end of the first conductive element, and the propagation of the first electromagnetic signal through the boundary will induce the second electromagnetic signal to propagate along the second conductive element toward a first end of the second conductive element.

22. The method of claim 13 wherein least one said first conductive element is positioned substantially parallel to at least one said second conductive element.

23. The method of claim 13 wherein the coupler's location is determined by the level of a fluid.

24. The method of claim 13 wherein at least of the conductive elements is flexible.

25. The method of claim 13 wherein the coupler operates as an electromagnetic shunt path between at least one said first conductive element and at least one said second conductive element.

26. The method of claim 13 wherein the quantity whose value the output represents is the level of a fluid.

* * * * *